Jan. 26, 1971  F. R. McFARLAND ET AL  3,557,460

DEPTH GAUGE

Filed May 15, 1968

INVENTORS.
Park H. Appler
Frederick R. McFarland

BY *Paul + Paul*

ATTORNEYS.

United States Patent Office 3,557,460
Patented Jan. 26, 1971

3,557,460
DEPTH GAUGE
Frederick R. McFarland and Park H. Appler, Lancaster, Pa., assignors to K-D Manufacturing Company, Lancaster, Pa., a corporation of Pennsylvania
Filed May 15, 1968, Ser. No. 729,194
Int. Cl. G01b 5/18
U.S. Cl. 33—172                                   2 Claims

ABSTRACT OF THE DISCLOSURE

A manually operable gauge is provided, having a backing plate with a spring-biased pointer mounted thereon, with the pointer pivotally secured to the mounting plate, and a free end of the pointer adapted to cooperate with measuring indicia, to indicate the depth of a groove, hole, etc., being measured. The measurement is facilitated by a feeler carried by the pointer member, the feeler being adapted for insertion into the void to be measured, and with the feeler being guided during its measuring movement.

BACKGROUND OF THE INVENTION

In many industries, particularly in the automotive industry, it becomes desirable to measure depth of various grooves, holes, and the like. It is thus highly desirable that there be provided a convenient means for taking such measurements, preferably by a device which is sufficiently small to be carried within the pocket of a mechanic.

Also, in the automotive industry, it has become commonplace for States and like jurisdictions to require a periodic inspection of an automobile, especially for safety features. One such feature which must necessarily be inspected is the depth of tire tread remaining. Another such feature normally requiring inspection, particularly on automobiles utilizing riveted brake shoes is the height of brake shoe remaining above the recessed rivet heads which hold the shoe lining onto their curved shoe flange. It is thus readily apparent, that, particularly in the latter instance, it is highly desirable to have a gauge which is sufficiently simple to operate, and which may be readily operated by a mechanic or the like, to give an accurate determination of the depth remaining of available brake shoe lining or tire tread. Because such indications may often be quite small, and because such gauges must normally be actuated by the true depth available within a given recess being measured, the depth indication of conventional measuring techniques is often so small as to be not readily legible.

Also, in devices of the prior art, the feeler which is used to measure the gauge is not generally fixed against lateral movement, in order that an accurate reading is not always obtained by the indicator portion of the gauge.

The present invention seeks to obviate the above and other undesirable features and limitations of prior art types of gauges in providing a gauge which takes the actual depth measurement of a void, and which magnifies such measurement for ease of visual observation by the mechanic. Also, the present invention is adapted to carefully guide the movement of the feeler and to transmit such movement to a pointer member in such a manner that an accurate measurement is obtained.

SUMMARY OF THE INVENTION

The gauge of this invention utilizes a pointer member which is pivotally connected at one end onto a backing plate, the other end of the pointer member being adapted for gauging arcuately arranged indicia thereon, corresponding to the pivotal position of the pointer member at a given time, with the pointer member being spring-biased toward a position indicating maximum depth of gauge measurement. A feeler member is pivotally carried by the pointer member, near the pivotal connection of the pointer member and backing plate with the feeler member being disposed generally transverse to the normal disposition of the pointer member, during its movement through a small pivotal arc, and with the feeler member being movable longitudinally in a direction generally normal to the disposition of the pointer member, the feeler member also being guided against lateral or substantial pivotal movement.

It is a primary object of this invention to provide a compact depth gauge capable of accurately indicating the depth of penetration of a feeler into a void.

It is another object of this invention to accomplish the above object, wherein the feeler is spring-biased and guided in its movement for facilitating the accuracy of measurements taken.

It is a further object of this invention to provide a depth gauge, wherein a visual indication of depth of the feeler is provided thereon, with actual depth of feeler penetration into a void being magnified for ease of observation by one using the gauge.

Other objects and advantages of the present invention will become readily apparent to one skilled in the art from the following brief description of the drawing figures, the detailed description of the preferred embodiment, and the appended claims.

Figure 1:
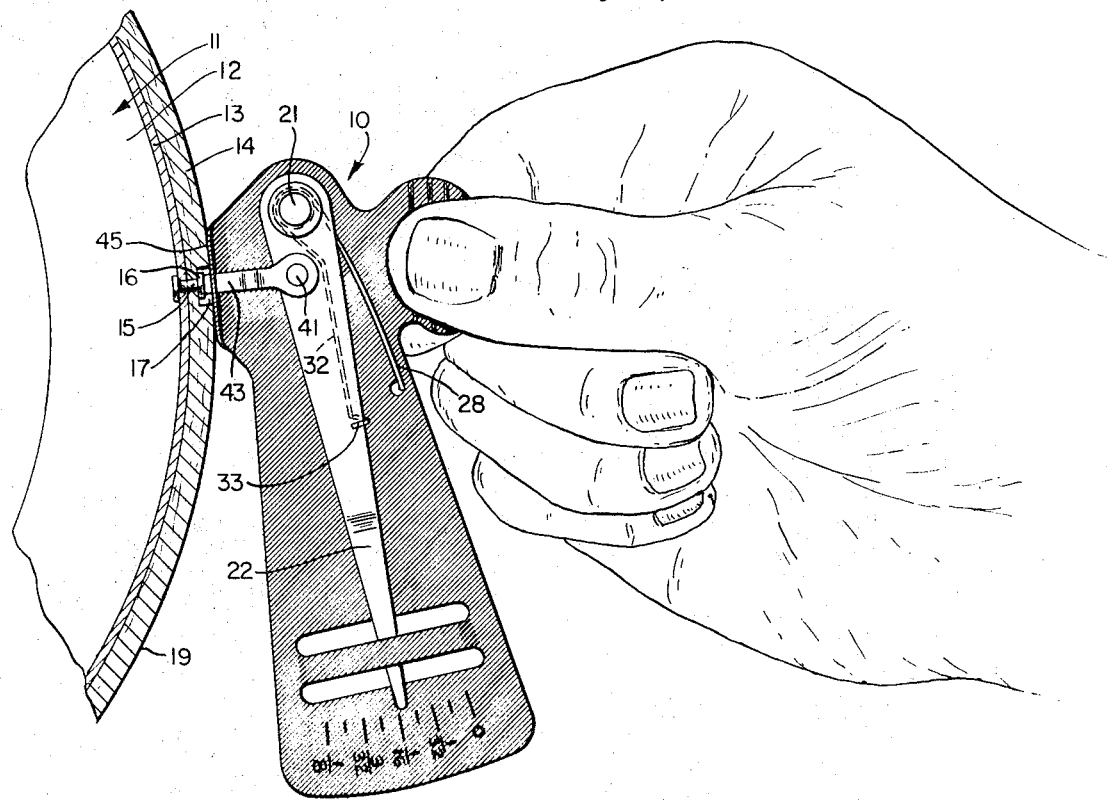
FIG. 1 is a front view of the depth gauge of this invention, illustrated in position for measuring the depth from the outer surface of a brake shoe lining to the top of the head of the rivet which holds the lining onto the brake shoe flange, with the gauge being illustrated as it would normally be held by a user.
Figure 2:
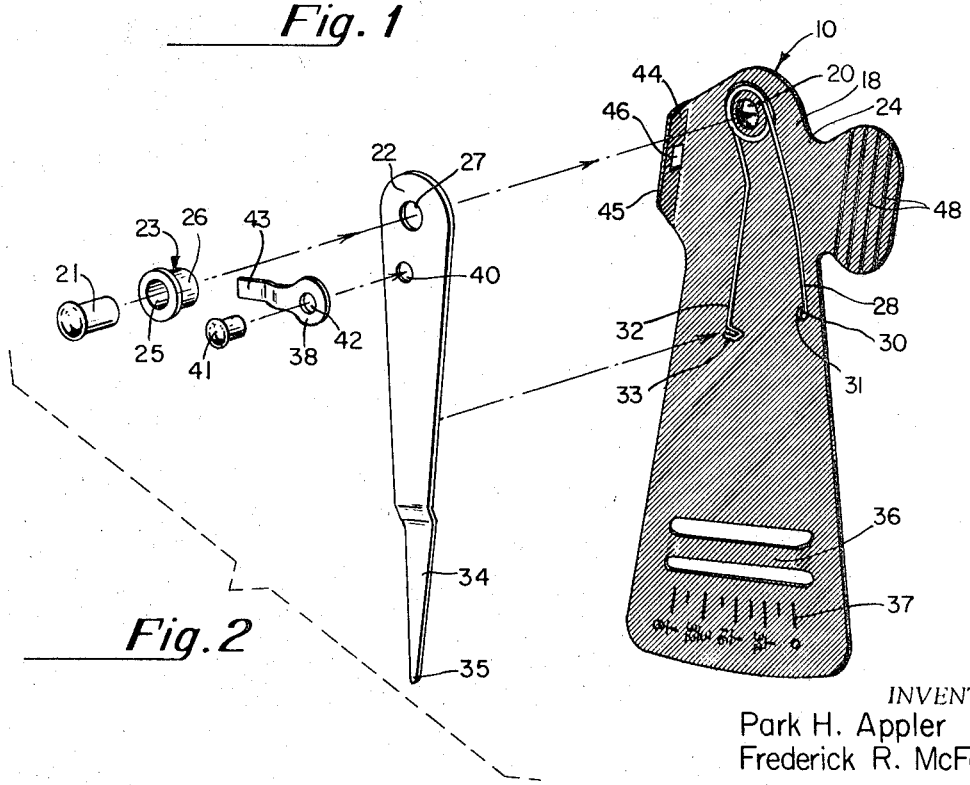
FIG. 2 is an exploded perspective view of the gauge of FIG. 1, wherein the several components thereof are clearly illustrated.

Referring now to the drawings in detail, reference is first made to FIG. 1, wherein there is illustrated a depth gauge, generally designated by the numeral 10.

A brake shoe 11 is fragmentally illustrated, and includes a web portion 12, a flange 13, and a lining portion 14, with the lining portion 14 being secured to the flange 13 by means of one or more rivets 15. Each rivet 15 has an outer rivet head 16 which is recessed in a counter bore 17, or similar void.

The depth gauge 10 includes a backing plate 18 having a hole 20 near one end, for receiving a rivet 21 therein, for carrying a pointer member 22 on the backing plate 18, in pivotal relationship with respect to the backing plate 18.

A stud 23 is mounted on the front surface 24 of the backing plate 18, about the hole 20 thereof, and receives therein the rivet 21, which passes through a bore 25 of the stud 23, and with a protruding boss 26 of the stud 23 passing through a pivot hole 27 and in abutment against the surface 24 of the backing plate 18, about the hole 20. The right-most end of the rivet 21 is upset at the rear side of the backing plate 18, to contain the rivet 21 outside the hole 20 of the backing plate 18.

In its assembled condition, the depth gauge 10 is so arranged that a wire spring 28 has one end 30 in engagement within a hole 31 of the backing plate 18, with the spring 28 then being wound for a single turn or more about the boss 26 of the stud 23, between the pointer member 22 and the backing plate 18, with another end 32 of the spring 28 having a hooked portion 33 for engagement along one end of the pointer member 22, as illustrated in FIG. 1.

The pointed member 22 has an offset lower end 34, being offset to be disposed more closely adjacent the surface 24 of the backing plate 18, and with the lower end 34 terminating in a point-like apex 35. The offset portion 34 of the pointer member 22 is guided by and slidably received between the surface 24 of the backing plate 18, and an outwardly raised loop portion 36, which protrudes outwardly of the surface 24 of the backing member 18 for retaining the pointer member 22 closely adjacent the surface 24 of the backing member 18, and preventing damage to the free end 35 thereof.

Positioned just below the loop portion 36 of the backing plate 18, are a plurality of indicia 37, indicating a fairly wide range, for example in the gauge illustrated of from 0 to ⅛ inch, such indicia being magnified but being representative of an accurate measurement range of ⅛ inch.

A feeler member 38 is pivotally connected to a bore 40 by means of a pivot 41, with the feeler member 38 having a bore 42 for facilitating pivotal movement of the feeler member 38 about the rivet 41. The feeler member 38 is disposed with its pivot 42 positioned closely adjacent the bore 27 of the pointer member 22, for increased magnification of any depth measurement taken to be reflected by the position of the apex portion 35 of the pointer member 22 relative to the indicia 37 of the backing plate 18.

The feeler member 38 includes a free end portion 43, which is adapted to enter voids such as that 17 of the brake shoe 11, for striking the bottom of such void, to determine the depth thereof.

The spring 28 is adapted to bias the pointer member 22 and the feeler member 38 toward positions of maximum depth measurement, such that, should the free end 43 be engaged against a surface portion of no relative depth as compared to the surrounding surface portion, the apex portion 35 of the pointer member 22 would be moved against the action of the spring 28 to an extreme rightward position, indicating "0" depth.

The backing plate 18 is provided with a feeler guide portion 44, being constructed as a flange of the same sheet metal material as is the backing plate 18, but being bent at a right angle thereto, to protrude upwardly from the surface 24 thereof. The guide portion 44 has an outermost surface 45 for engagement against the surface of the article to be gauged, for example against the surface 19 of the brake shoe illustrated in FIG. 1.

A rectangular hole 46 is provided in the feeler guide portion 44, for receiving the free end 43 of the feeler 38 therethrough, and for maintaining the feeler 43 free for longitudinal movement therethrough, in a direction substantially perpendicular to the surface 45 of the feeler guide portion 44, and also in a direction generally perpendicular to the disposition of the pointer member 22, inasmuch as the pointer member can be said to be substantially fixedly positioned on the backing plate 18, being pivotable thereon only through the narrow arc determined by the indicia 37.

The backing plate 18 also includes a manually graspable portion 47, being generally coplanar with the major portion of the backing plate 18, but protruding therefrom for engagement by the hand of a mechanic or the like, as indicated in FIG. 1, with the graspable portion 47 having longitudinal ribs 48 therein for facilitating slip-free engagement by the hand of a mechanic or other such user.

It will be apparent that the depth magnification of this invention is dependent upon the location of the hole 40 in the pointer member 22, which facilitates the pivotal movement of the feeler 38 relative to the pointer member 22. Thus the placement of the hole 40 relative to the hole 27 on the pointer member 22 determines the amount which the free end 43 of the feeler member 38 will protrude beyond the surface 45 of the feeler guide 44, which in turn controls the maximum void depth which the device is capable of measuring, as well as controlling the magnification of the measured depth.

The above embodiment has been selected for purposes of description only, in order to facilitate an understanding of the invention herein. However, various modifications may be made in the details of construction, operation and the like, all within the spirit and scope of the invention as recited in the appended claims. For example, while the device illustrated is capable of magnifying the actual gauge measurement by several times in order to facilitate the enlargement of the visual indication on the indicia 37, by pivotally locating the feeler member further away from the pointer member pivot point, greater depth indications of lesser magnification would be obtained.

What is claimed is:

1. A depth gauge comprising a backing plate, a pointer member and a feeler member, wherein said pointer member is pivotally connected to said backing plate at one end of said pointer member, with indicia being disposed on said backing plate and an opposite end of said pointer member being adapted for cooperation with said indicia for indicating measurements, said feeler member having one end pivotally connected to and carried by said pointer member, including an apertured flange carried by said backing plate for laterally confining said feeler member at its other free end for maintaining substantially perpendicular disposition of said feeler member relative to said pointer member as said pointer member pivots through a slight arc, said free end of said feeler member being adapted for engagement with articles to be gauged, wherein said flange extends transversely of said backing plate, said flange having a free outer surface thereof for engagement against surfaces of articles to be gauged, said backing plate including a handle portion protruding therefrom in coplanar relationship thereto, wherein said handle portion of said backing plate is ribbed for slip-free engagement, including guide means deformed from the backing plate to define a slot parallel to the backing plate for confining the pivotal movement of said free end of said pointer member, wherein said flange, said handle portion and said guide means are integral with said backing plate, wherein said flange is bent transversely of said backing plate, including spring means for biasing said feeler member toward a position for indicating maximum depth on said indicia, and wherein said spring means comprises a spring in engagement with said pointer member and said backing plate.

2. The gauge of claim 1, wherein said spring is of wire construction and comprises a spring loop portion disposed about the point of pivotal connection between said pointer member and said backing plate, and between free ends of said spring; with opposite free ends of said spring being in engagement respectively with one each of said pointer member and backing plate.

References Cited

UNITED STATES PATENTS

| 962,583 | 6/1910 | Pember | 33—172(A)X |
|---|---|---|---|
| 1,230,166 | 6/1917 | Hunger | 33—202 |
| 1,862,531 | 6/1932 | Englund | 33—172(A)X |
| 1,952,190 | 3/1934 | Wells | 33—168(B)X |
| 2,322,278 | 6/1943 | Buckwalter | 33—172(A)UX |

FOREIGN PATENTS

| 659,950 | 2/1929 | France | 33—172(A) |
|---|---|---|---|
| 310,322 | 1/1919 | Germany | 33—168(A) |

ROBERT B. HULL, Primary Examiner 445-67

PO-1050
(5/69)

UNITED STATES PATENT OFFICE
CERTIFICATE OF CORRECTION

Patent No. 3,557,460     Dated January 26, 1971

Inventor(s) Park H. Appler and Frederick R. McFarland

It is certified that error appears in the above-identified patent and that said Letters Patent are hereby corrected as shown below:

Column 2 line 70 change "end" to

--edge--,

Signed and sealed this 18th day of May 1971.

(SEAL)
Attest:

EDWARD M. FLETCHER, JR.
Attesting Officer

WILLIAM E. SCHUYLER, J.
Commissioner of Patent